No. 643,869. Patented Feb. 20, 1900.
G. B. GATES.
ACETYLENE GAS LAMP.
(Application filed May 12, 1898. Renewed Aug. 5, 1899.)
(No Model.)
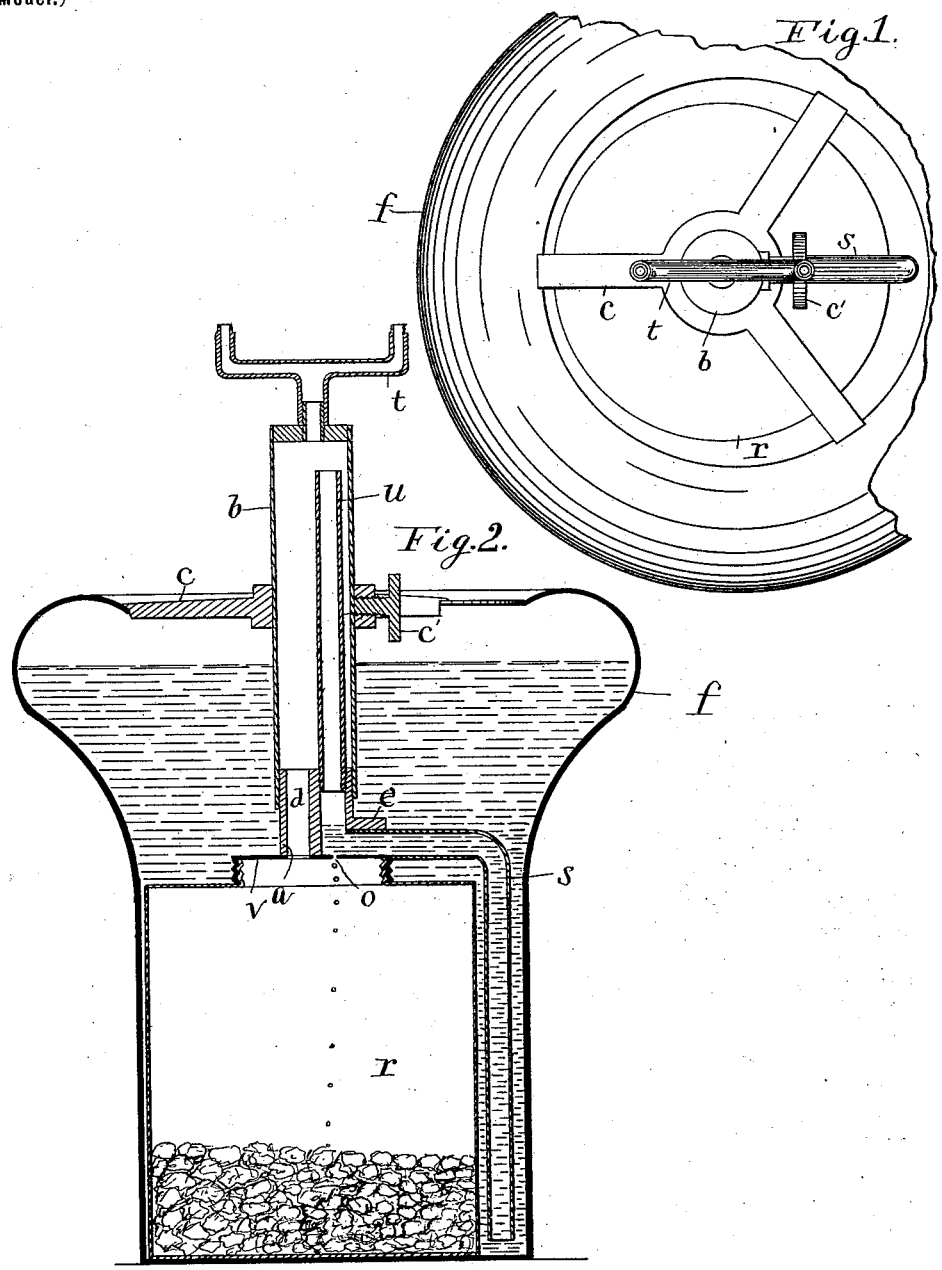

UNITED STATES PATENT OFFICE.

GEORGE B. GATES, OF PORTLAND, MAINE.

ACETYLENE-GAS LAMP.

SPECIFICATION forming part of Letters Patent No. 643,869, dated February 20, 1900.

Application filed May 12, 1898. Renewed August 5, 1899. Serial No. 726,331. (No model.)

*To all whom it may concern:*

Be it known that I, GEORGE B. GATES, a citizen of the United States of America, and a resident of Portland, Cumberland county, State of Maine, have invented certain new and useful Improvements in Acetylene-Gas Machines, of which the following is a specification.

My invention relates to a gas-generating apparatus, and particularly to an apparatus for the generation of acetylene gas from calcium carbid.

The invention is directed to an improved construction of that form of apparatus in which the requisite amount of water is automatically supplied to the generating-chamber as fast as it is needed and in which the flow of water is automatically shut off when the pressure of gas exceeds a predetermined limit without the use of valves or other mechanically-operating mechanism.

The invention consists of a generating-chamber connected with a liquid-reservoir by means of a communicating liquid-supply tube or duct which is constricted or made smaller at the point where it enters the generating-chamber and is in the smaller form of apparatus small enough to become a capillary opening, with a gas tube or duct connecting the generating-chamber with the liquid-supply tube or duct for the purpose of quickly conveying the pressure within the generating-chamber to the liquid within the supply-tube.

The invention further consists in submerging the generating-chamber within the liquid-reservoir and providing means for retaining the generating-chamber at varying heights to regulate the normal pressure within the generating-chamber.

Another feature of the invention consists in constructing the reservoir with an open top and so forming the generating-chamber that it can be freely lifted in and taken out through said open top to be filled, &c.

I illustrate my invention by means of the accompanying drawings, in which is shown a simple form of the invention designed to be used for the generating of acetylene gas and fitted up to be used as a portable lamp.

In the drawings, Figure 1 is a plan or top view, and Fig. 2 is a central vertical section.

$r$ represents the gas-generating chamber, in which the carbid is placed, and this chamber I have here shown as contained in and submerged in a water tank or reservoir $f$, although it is evident that the two vessels may be independent of each other except so far as a water connection is concerned, and the generating-chamber and regulating device may be independent except a connection for the conveyance of the water to the generating-chamber. The reservoir is constructed with an open top, and the generating-chamber is so made that it may be readily lifted out and put in whenever necessary to fill the generating-chamber or for any other purpose. The generating-chamber is thus always surrounded with water, by which it is kept cool, and it may be quickly and easily removed from the tank at any time.

Water is admitted to the chamber $r$, preferably at the top, through a constricted opening $o$, which may be a perforation in the top of the chamber, as here shown, or other small opening suitably located.

In portable lamps and other forms of small apparatus it is important, in order to secure the action herein often spoken of, that the opening $o$ should be small enough to be a capillary opening—that is to say, it should be capable of holding itself full of water by capillary attraction. The opening may be made capillary either by decreasing it in size or by filling it with some fibrous material or in any other manner. A connection is made between the opening $o$ and the water in the reservoir, so that the water is supplied under a head or pressure sufficient to overcome the normal gas-pressure within the chamber. The connection is made between the opening and the reservoir by means of a free or normally-open water-supply tube or duct $s$, which connects with the opening and preferably extends downward to a point below the level of the opening and connecting with the interior of the reservoir. By means of this connection a water seal is formed, which allows the gas, when an excess of pressure is present, to expand and fill or partially fill the tube $s$, driving the water therefrom without wasting any of the gas. It is obvious that this tube may be of any suitable size and may be made to contain a considerable quantity of gas.

In order to give the gas more freedom to act upon the water in the tube $s$ than it would get by acting directly through the opening $o$, I connect the upper end of the tube $s$ with the interior of the generating-chamber by means of a gas tube or duct $u$, whereby the gas-pressure on the inside of the generating-chamber is conveyed to the surface of the water in the water-supply tube $s$. In order to make this connection with the interior of the generating-chamber, as herein shown, I provide a tubular extension $b$, which connects with the cover $v$ of the generating-chamber by means of a casting or coupling $d$. The coupling has a right-angled passage $e$, connecting at its lower end with the tube $s$ and the opening $o$, and at its upper end with the pressure-tube $u$, which, as here shown, lies wholly within the tubular extension $b$. At the upper end of the extension $b$ is shown the tubular connection $t$, the burners not being shown.

The tubular extension $b$ is utilized as a means for supporting the chamber $r$ within the reservoir, and means are provided for securing the chamber at varying heights, according to the gas-pressure in the generator. The means here shown consist of a spider or supporting frame $c$, held in the top of the reservoir $f$ and having an opening through which the tubular extension $b$ passes and a set-screw $c'$ for fastening it in any desired position.

It will be readily understood that when the chamber $r$ or the lower end of the duct is submerged sufficiently, the opening $o$ will be under pressure below the water-level, the water will be forced through it by the weight of the columns above it, and dropping on the carbid will cause the generation of gas. It is important that the water shall be introduced through a submerged opening in order to secure a steady flow while the apparatus is in action. If the burners are open and the gas is allowed to escape under a limited pressure as fast as formed, the water will continue to run in as required; but if the burners are closed or any undue amount of gas is generated, then the back pressure on the water through the opening $o$ and through the pressure-tube $u$ will force the water back and down the tube $s$ to a greater or less extent and stop the generation of gas. The total head of water is represented by the height of the column over opening $o$, this column being subject, on the one hand, to the pressure of the water in the tank and, on the other hand, to the pressure of gas in the generating-chamber. As the latter pressure fluctuates, the level of this column will change, and when it is forced down below the orifice $o$ by the increased pressure of the gas the flow of water will stop. It is evident by submerging the chamber $r$ to a greater or less extent in the reservoir $f$ a greater or less normal pressure can be maintained in the generator or the generation of gas altogether stopped by elevating the feed-opening of the generating-chamber above the level of the water in the reservoir.

By making the opening $o$ capillary the water will pass through gradually and with an even flow so long as there is a head of water above the opening, varying in speed or quantity according to the head, and no undue amount of water will be forced through the opening by a sudden increase of pressure, as would sometimes be the case with an opening not small enough to be capillary. The capillary attraction acts as a safety device against the sudden rush of too great a supply of water through the opening in case of a sudden decrease of gas-pressure, and consequently it is of great importance in small forms of apparatus.

When it is desired to recharge the chamber with carbid, the cover $v$ is unfastened and the contents of the chamber changed or a duplicate chamber may be attached.

It is evident that many different modifications can be made of my device while keeping within the terms of my invention, and consequently I do not desire to limit myself to the specific construction here shown. The device is entirely automatic and governs itself without the use of any valves or other operating mechanism and without the retention of any considerable quantity of gas in the apparatus.

While the apparatus is here shown as being applied to a lamp, it can be used wherever the generation of acetylene gas is desired, and it can also be applied to the generation of any other gas from a volatile liquid when the liquid is to be fed under pressure to a generating-chamber.

I claim—

1. In a gas-generating apparatus, the combination of a generating-chamber, a liquid-reservoir, a communicating duct or tube between said reservoir and the generating-chamber, the communication between the tube and the generating-chamber being a constricted opening of less area than the cross-area of the said tube or duct, and a gas tube or duct connecting the generating-chamber with the liquid tube or duct above the opening into the generating-chamber, substantially as described.

2. In a gas-generating apparatus the combination of a generating-chamber, a liquid-reservoir, a communicating duct or tube between said reservoir and the generating-chamber, the communication between the tube and the generating-chamber being a capillary opening and a gas tube or duct connecting the generating-chamber with the liquid tube or duct above the opening into the generating-chamber, substantially as described.

3. In a gas-generating apparatus the combination of a water-reservoir, a gas-generating chamber contained therein, a water-supply opening in said generating-chamber a water-supply duct connecting with said opening and extending downward below the level thereof and means for adjusting the vertical position of said chamber within the reservoir substantially as described.

4. In a gas-generating apparatus the combination of a water-reservoir open to atmospheric pressure a gas-generating chamber contained therein, a water-supply opening in said generating-chamber connecting with the interior of the water-reservoir and means for adjusting the vertical position of said opening with reference to the water-level within the reservoir, substantially as described.

GEORGE B. GATES.

Witnesses:
S. W. BATES,
A. R. MORRILL.